United States Patent
Yang et al.

(10) Patent No.: US 11,161,145 B2
(45) Date of Patent: Nov. 2, 2021

(54) SURFACE TREATMENT METHOD FOR HOUSING

(71) Applicant: ASUSTEK COMPUTER INC., Taipei (TW)

(72) Inventors: Guo-Lin Yang, Taipei (TW); Yu-Chun Yang, Taipei (TW); Po-Wen Huang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 16/575,115

(22) Filed: Sep. 18, 2019

(65) Prior Publication Data

US 2020/0086345 A1 Mar. 19, 2020

(30) Foreign Application Priority Data

Sep. 19, 2018 (CN) .......................... 201811094208.9

(51) Int. Cl.
| | |
|---|---|
| *B05D 7/14* | (2006.01) |
| *B05D 3/06* | (2006.01) |
| *B05D 7/00* | (2006.01) |
| *B05D 5/06* | (2006.01) |
| *H02P 29/40* | (2016.01) |
| *H02K 5/02* | (2006.01) |

(52) U.S. Cl.
CPC .............. *B05D 7/14* (2013.01); *B05D 3/067* (2013.01); *B05D 5/06* (2013.01); *B05D 7/546* (2013.01); *B05D 7/576* (2013.01); *H02K 5/02* (2013.01); *H02P 29/40* (2016.02); *B05D 2451/00* (2013.01); *B05D 2503/00* (2013.01)

(58) Field of Classification Search
CPC . B05D 7/15; B05D 3/067; B05D 5/06; B05D 7/546; B05D 5/02
USPC .......................................................... 427/508
See application file for complete search history.

(56) References Cited

U.S. PATENT DOCUMENTS

| | | | | |
|---|---|---|---|---|
| 10,512,931 | B2* | 12/2019 | Ko | ........................ H01L 51/00 |
| 2011/0159277 | A1* | 6/2011 | Chiang | .................... B44C 3/02 |
| | | | | 428/336 |
| 2012/0018340 | A1* | 1/2012 | Chang | .................. C23C 14/086 |
| | | | | 206/524.3 |
| 2014/0009873 | A1* | 1/2014 | Nashner | ................ B41M 5/267 |
| | | | | 361/679.01 |
| 2020/0031141 | A1* | 1/2020 | Yoo | ...................... C09D 11/322 |

FOREIGN PATENT DOCUMENTS

| | | |
|---|---|---|
| CN | 105598018 A | 5/2016 |
| CN | 107999361 A | 5/2018 |
| WO | WO-2017028199 A1 * 2/2017 ........... B32B 27/302 |

\* cited by examiner

*Primary Examiner* — Dah-Wei D. Yuan
*Assistant Examiner* — Kristen A Dagenais-Englehart
(74) *Attorney, Agent, or Firm* — Muncy, Geissler, Olds & Lowe, P.C.

(57) ABSTRACT

A processing method for a housing includes: providing a housing; forming a color layer on the housing; forming an ultraviolet curable layer on the color layer and executing a photo-curing process on the ultraviolet curable layer, materials of the ultraviolet curable layer including a light sensitive resin and a nano metal material; and forming an optical coating layer on the ultraviolet curable layer.

8 Claims, 6 Drawing Sheets

SURFACE TREATMENT METHOD FOR HOUSING

CROSS-REFERENCE TO RELATED APPLICATION

This application claims the priority benefit of Chinese Application Serial No. 201811094208.9, filed on Sep. 19, 2018. The entirety of the above-mentioned patent application is hereby incorporated by reference herein and made a part of the specification.

BACKGROUND OF THE INVENTION

Field of the Invention

The disclosure relates to a surface treatment method for a housing and, more particularly, to a surface treatment method for a housing of an electronic apparatus.

Description of the Related Art

Common materials for a housing of an electronic apparatus include plastics, metals, and ceramics (glass). A plastic housing has advantages such as light weight, low cost, easy processing, and no electromagnetic interference to wireless signals. A metal housing has advantages such as high hardness and high heat conductivity. However, a conventional surface treatment technique for a housing, such as paint spraying, in mold labeling (IML), electroplating, mold texturing, and printing, cannot enable a surface of a plastic housing or a metal housing to present luster and texture of a ceramic material, to attract attention of consumers.

BRIEF SUMMARY OF THE INVENTION

Accordingly, the disclosure provides a processing method for a housing to reduce a thickness of an ultraviolet curable layer, to present luster and texture similar to those presented by ceramics.

The disclosure provides a processing method for a housing, including: providing a housing; forming a color layer on the housing; forming an ultraviolet curable layer on the color layer and executing a photo-curing process on the ultraviolet curable layer, materials of the ultraviolet curable layer including a light sensitive resin and a nano metal material; and forming an optical coating layer on the ultraviolet curable layer.

A conventional treatment method for a housing cannot enable a surface of a plastic or metal casing to present luster and texture of a ceramic material. By comparison, the surface treatment method for a housing provided by the disclosure reduces a thickness of an ultraviolet curable layer, to present luster and texture similar to those presented by ceramics.

Specific embodiments of the disclosure will be further described by using the following examples and drawings.

DETAILED DESCRIPTION OF THE EMBODIMENTS

Specific embodiments of the disclosure will be described in further detail below with reference to schematic drawings. The advantages and features of the disclosure will become more apparent from the following description and claims. It is to be noted that the drawings are all in a very simplified form and are not drawn to accurate scale, but are merely used for convenience and clarity of description of the embodiments of the disclosure.

Figure 1:
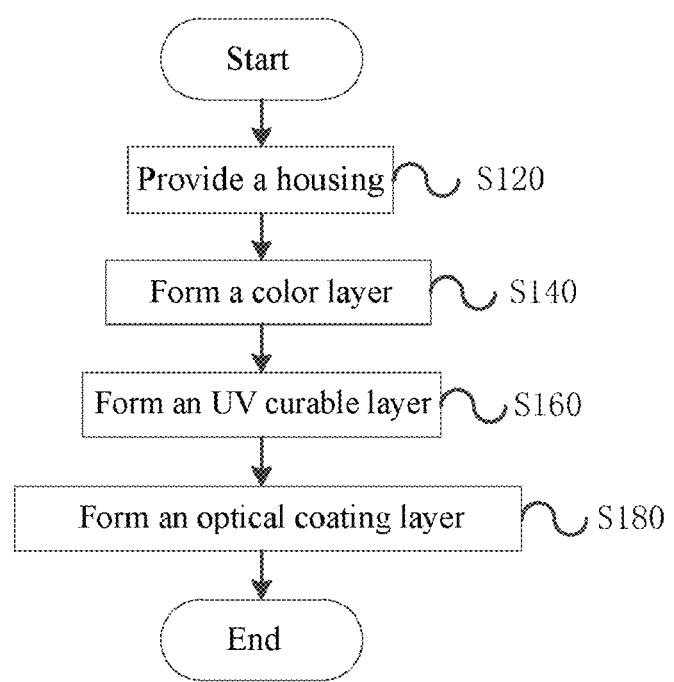
FIG. 1 is a flowchart of a first embodiment of a surface treatment method for a housing according to the disclosure.

FIG. 1 is a flowchart of a first embodiment of a surface treatment method for a housing according to the disclosure. FIG. 2A to FIG. 2D are schematic cross-sectional views of the surface treatment method for a housing shown in FIG. 1. The processing method is applied in a housing of an electronic apparatus, such as a plastic back cover 10 of a mobile phone, as shown in FIG. 3. However, the disclosure is not limited thereto. The surface treatment method for a housing is also applicable to a metal material, such as a housing made of an aluminum alloy and an aluminum-magnesium alloy. Furthermore, the surface treatment method for a housing is also applicable to another kind of electronic apparatus, such as a tablet computer and a notebook computer.

As shown in FIG. 1, the surface treatment method for a housing includes the following steps.

Figure 2A:
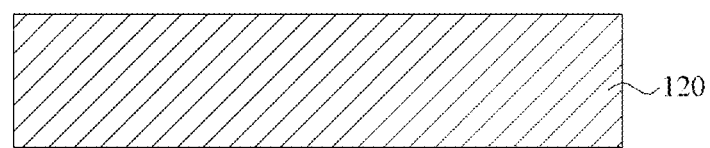
FIG. 2A to FIG. 2D are schematic cross-sectional views of the surface treatment method for a housing shown in FIG. 1.
Figure 3:
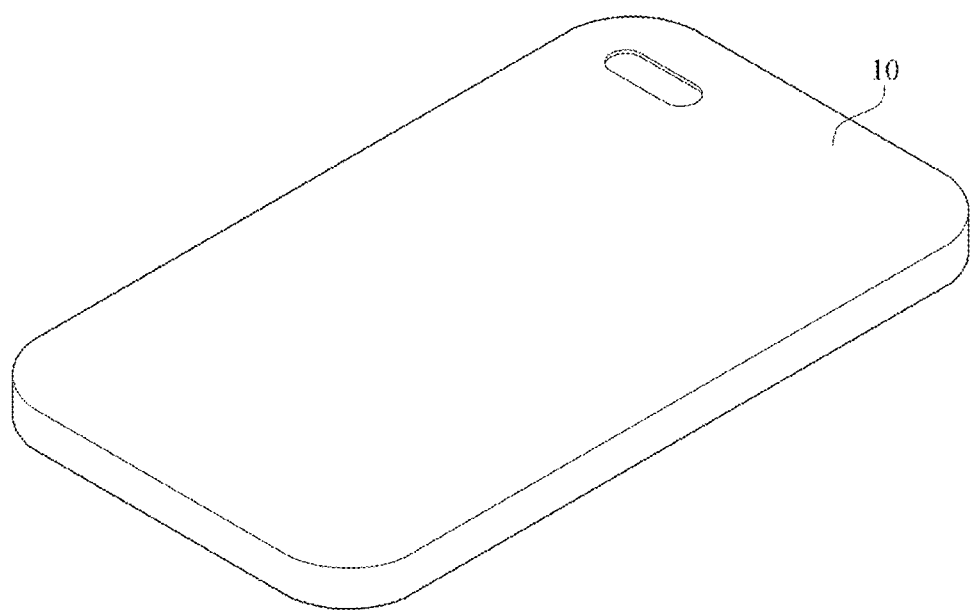
FIG. 3 is a schematic diagram of a plastic back cover of a mobile phone.

First, referring to FIG. 2A, in step S120, a housing 120 is provided, in an embodiment, a plastic back cover 10 of a mobile phone shown in FIG. 3.

Figure 2B:
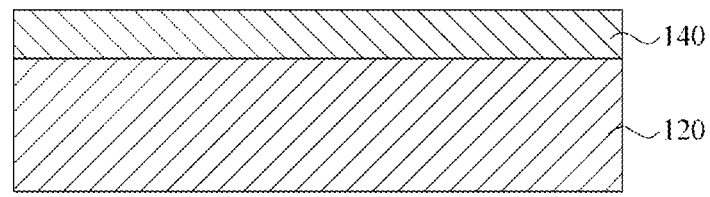

Then, referring to FIG. 2B, in step S140, a color layer 140 is formed on the housing 120. In an embodiment, the color layer 140 is a polyurethane coating material layer, that is, a PU paint layer.

Figure 2C:
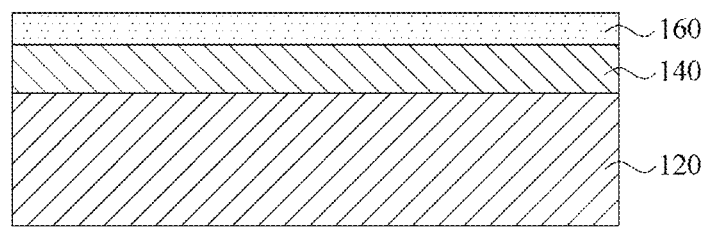

Next, referring to FIG. 2C, in step S160, an ultraviolet curable layer 160 is formed on the color layer 140. Then, the ultraviolet curable layer 160 is photo-cured, that is, ultraviolet is used to irradiate a paint layer, so that the paint layer is cured to become a film. In an embodiment, ultraviolet energy of the photo-curing is in a range of 600-900 J.

In an embodiment, components of the ultraviolet curable layer 160 include a light sensitive resin and a nano metal material, such as nano silver. A preparation procedure of a coating material of the ultraviolet curable layer 160 is described as follows.

First, the light sensitive resin is fully ground and stands a while after being ground, and the light sensitive resin in the upper layer, such as 70%-80% of the light sensitive resin in the upper portion, is taken, to obtain uniform light sensitive resin particles.

Then, the nano metal material is added to the light sensitive resin. In an embodiment, in this step, according to actual demand, a modifier and a medium are added to the light sensitive resin. The modifier and the medium are common coating material additives, and used to change the properties of a coating material and enhance performance of a coating layer.

Then, grinding is performed to fully mix the light sensitive resin and the nano metal material.

Compared with a conventional coating material for an ultraviolet curable layer, the coating material for the ultraviolet curable layer 160 in this embodiment presents better metal texture and makes a user perform another coating operation on a surface of the paint layer conveniently. Secondly, the coating material of the ultraviolet curable layer 160 in this embodiment has better leveling and helps to reduce a thickness of the paint layer (a thickness of a conventional cured ultraviolet curable layer is in a range of 12-25 um, and a thickness of the cured ultraviolet curable layer in this embodiment is reduced to be in a range of 8-16 um), to avoid paint accumulating on corners, thereby improving to manufacture a 3D plating layer and making an appearance of the paint layer present texture close to ceramics and glass. Furthermore, the ultraviolet curable layer 160 is also cured by baking and drying a film layer under a high temperature, so as to avoid photo-curing producing incompletely.

Figure 2D:
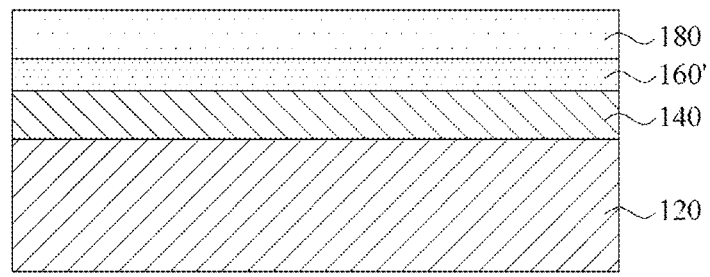

Subsequently, referring to FIG. 2D, in step S180, an optical coating layer 180 is formed on a cured ultraviolet curable layer 160'.

In an embodiment, the optical coating layer 180 is a vacuum plating film layer, in an embodiment, a plating layer made in a manner of vacuum evaporation. In an embodiment, components of the optical coating layer 180 contain nano glass materials. In an embodiment, the nano glass materials include aluminum oxide ($Al_2O_3$), dititantum pentoxide ($Ti_2O_5$), silicon monoxide (SiO), niobium pentoxide ($NbO_5$), and a nano fluorine material.

The ultraviolet curable layer 160 in the disclosure is thin, a chemical reaction occurs between the material of the optical coating layer 180 and the underneath color layer 140 through the ultraviolet curable layer 160', to change the original color of the color layer 140. The change helps to enhance texture of a surface of a housing (especially a plastic housing) and makes luster of the housing as a whole be closer to luster of ceramics and glass.

Figure 4:
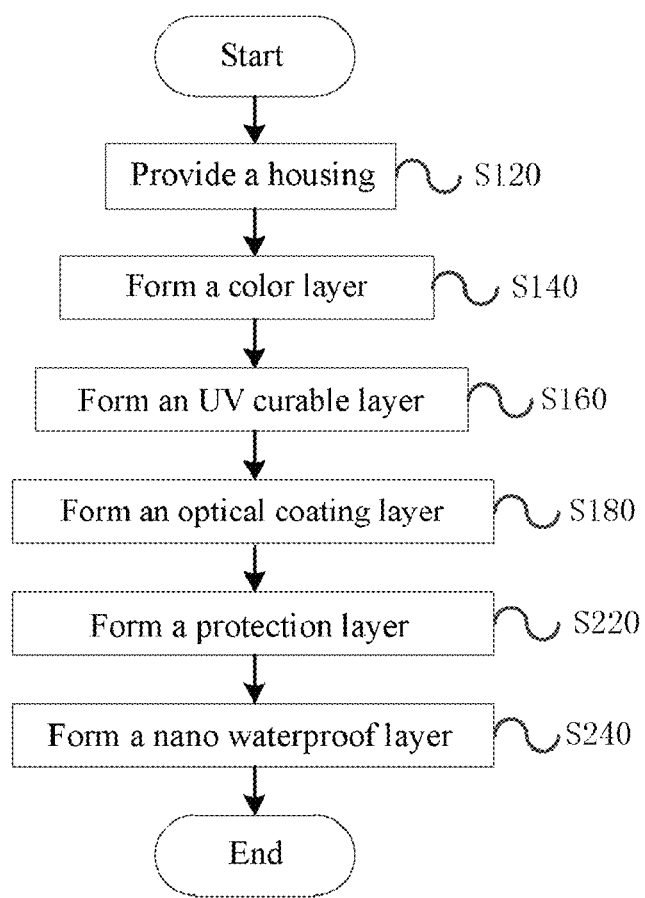
FIG. 4 is a flowchart of a second embodiment of a surface treatment method for a housing according to the disclosure.

FIG. 4 is a flowchart of a second embodiment of a surface treatment method for a housing according to the disclosure. This embodiment is different from the embodiment in FIG. 1 in that, in this embodiment, after the optical coating layer 180 is formed, steps S220 and S240 are performed.

Figure 5A:
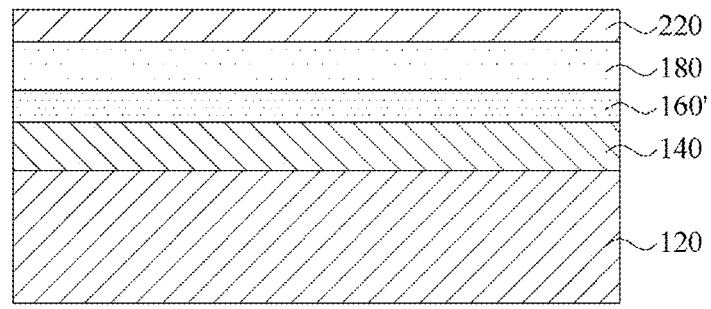
FIG. 5A to FIG. 5B are schematic cross-sectional views of the surface treatment method for a housing shown in FIG. 4.

First, referring to FIG. 5A, in step S220, a protection layer 220 is formed on the optical coating layer 180. In an embodiment, the protection layer 220 is formed on the optical coating layer 180 in a manner of vacuum evaporation. The protection layer 220 has functions such as anti-fog (AF), anti-glare (AG), or anti-friction. However, the disclosure is not limited thereto. In another embodiment, the step performs surface treatment on the optical coating layer 180 directly, to generate required functions.

Figure 5B:
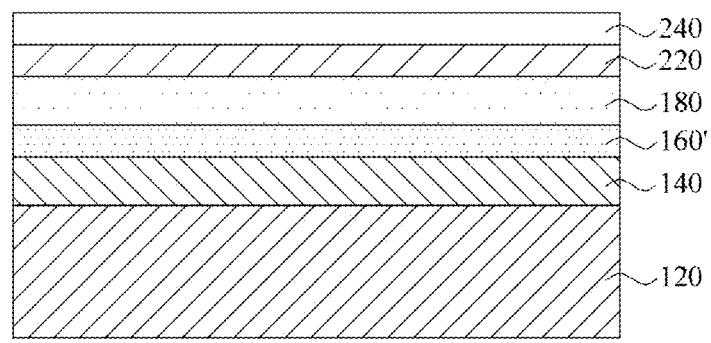

Then, referring to FIG. 5B, in step S240, a nano waterproof layer 240, in an embodiment, a coating layer having hydrophobicity, is formed on the protection layer 220. In an embodiment, the nano waterproof layer 240 is formed on the protection layer 220 in a manner of chemical vapor deposition, to cover the whole housing 120.

A conventional treatment method for a housing cannot enable a surface of a plastic or metal casing to present luster and texture of a ceramic material. By comparison, the treatment method for a housing provided by the disclosure reduces a thickness of an ultraviolet curable layer, to present luster and texture similar to those presented by ceramics.

The foregoing descriptions are merely preferred embodiments of the disclosure and are not intended to limit the disclosure in any way. Any person skilled in the art can make any form of equivalent replacement or modification to the technical means and technical contents disclosed by the disclosure without departing from the scope of the technical means of the disclosure, and such equivalent replacement or modification does not depart from the contents of the technical means of the present disclosure and still falls within the protection scope of the disclosure.

What is claimed is:

1. A surface treatment method for a housing, comprising:
    providing a housing;
    forming a color layer on the housing;
    forming an ultraviolet curable layer on the color layer and executing a photo-curing process on the ultraviolet curable layer, components of the ultraviolet curable layer comprising a light sensitive resin and a nano metal material; and
    forming an optical coating layer directly deposited on the ultraviolet curable layer, wherein components of the optical coating layer comprise nano glass materials, wherein the nano glass materials is aluminum oxide, dititantum pentoxide ($Ti_2O_5$), silicon monoxide (SiO), niobium pentoxide ($NbO_5$), or a nano fluorine material;
    wherein a chemical reaction to change a color of the color layer occurs between the material of the optical coating layer and the underneath color layer through the ultraviolet curable layer.

2. The surface treatment method for a housing according to claim 1, wherein after the step of forming the optical coating layer, the surface treatment method for a housing further comprises forming a protection layer on the optical coating layer.

3. The surface treatment method for a housing according to claim 2, wherein after the step of forming the protection layer, the surface treatment method for a housing further comprises forming a nano waterproof layer on the protection layer.

4. The surface treatment method for a housing according to claim 1, wherein the optical coating layer is formed on the ultraviolet curable layer in a manner of vacuum evaporation.

5. The surface treatment method for a housing according to claim 1, wherein a thickness of the ultraviolet curable layer is in a range of 8-16 um.

6. The surface treatment method for a housing according to claim 1, wherein ultraviolet energy of the photo-curing process is in a range of 600-900 J.

7. The surface treatment method for a housing according to claim 1, wherein the optical coating layer is a 3D plating layer.

8. The surface treatment method for a housing according to claim 1, wherein the housing is a plastic housing or a metal housing.

* * * * *